United States Patent
Hahn et al.

(10) Patent No.: US 12,408,144 B2
(45) Date of Patent: Sep. 2, 2025

(54) METHOD AND DEVICE FOR PAGING IN SIDELINK COMMUNICATION

(71) Applicants: HYUNDAI MOTOR COMPANY, Seoul (KR); KIA CORPORATION, Seoul (KR); Wonkwang University Center For Industry-Academy Cooperation, Iksan-si (KR)

(72) Inventors: Gene Back Hahn, Hwaseong-si (KR); Ui Hyun Hong, Hwaseong-si (KR); Hyuk Min Son, Iksan-si (KR)

(73) Assignees: Hyundai Motor Company, Seoul (KR); Kia Corporation, Seoul (KR); Wonkwang University Center For Industry-Academy Cooperation, Iksan-si (KR)

( * ) Notice: Subject to any disclaimer, the term of this patent is extended or adjusted under 35 U.S.C. 154(b) by 0 days.

(21) Appl. No.: 18/198,119

(22) Filed: May 16, 2023

(65) Prior Publication Data

US 2023/0292289 A1    Sep. 14, 2023

Related U.S. Application Data

(63) Continuation-in-part of application No. PCT/KR2021/017109, filed on Nov. 19, 2021.
(Continued)

(30) Foreign Application Priority Data

Nov. 19, 2020    (KR) ........................ 10-2021-0160201

(51) Int. Cl.
*H04W 68/02*    (2009.01)
*H04W 72/02*    (2009.01)

(52) U.S. Cl.
CPC .......... *H04W 68/02* (2013.01); *H04W 72/02* (2013.01)

(58) Field of Classification Search
CPC ..... H04W 72/02; H04W 72/25; H04W 74/40; H04W 74/0808; H04W 74/006;
(Continued)

(56) References Cited

U.S. PATENT DOCUMENTS

2020/0029245 A1    1/2020    Khoryaev et al.
2020/0037358 A1    1/2020    Chae et al.
(Continued)

FOREIGN PATENT DOCUMENTS

KR    10-2103725 B1    4/2020
WO    2017/150958 A1    9/2017

OTHER PUBLICATIONS

International Search dated Mar. 8, 2022 issued in International Patent Application No. PCT/KR2021/017109 (w/ English translation).
(Continued)

*Primary Examiner* — Marcus Smith
*Assistant Examiner* — Rowan K Fakhro
(74) *Attorney, Agent, or Firm* — Morgan Lewis & Bockius LLP

(57) ABSTRACT

A method for paging in sidelink communication include the steps of: receiving window configuration information from a base station; performing a first resource sensing operation for transmission of a paging message within A window indicated by the window configuration information to determine P candidate resources; performing an operation of selecting a P transmission resource from among the P candidate resources within B window indicated by the window configuration information, and a second resource sensing operation for transmission of data associated with the paging message; and transmitting the paging message to a receiving terminal by use of the P transmission resource.

18 Claims, 10 Drawing Sheets

Related U.S. Application Data

(60) Provisional application No. 63/116,331, filed on Nov. 20, 2020.

(58) Field of Classification Search
CPC ..... H04W 92/18; H04W 72/04; H04W 72/12; H04W 4/40–48
See application file for complete search history.

(56) References Cited

U.S. PATENT DOCUMENTS

| | | | |
|---|---|---|---|
| 2020/0229171 A1* | 7/2020 | Khoryaev | H04W 4/40 |
| 2021/0152992 A1* | 5/2021 | Balasubramanian | H04W 68/02 |
| 2023/0239834 A1* | 7/2023 | Ye | H04W 68/02 455/458 |
| 2023/0337188 A1* | 10/2023 | Selvanesan | H04W 72/044 |

OTHER PUBLICATIONS

"Discussion on remaining open issue for mode 2," 3GPP TSG-RAN WG1 Meeting #100e, e-Meeting, Feb. 24 through Mar. 6, 2020 (R1-2000493).

"Discussion on remaining open issue for mode 2," 3GPP TSG-RAN WG1 Meeting #100bis-e, e-Meeting, Apr. 20-30, 2020 (R1-2001749).

* cited by examiner

METHOD AND DEVICE FOR PAGING IN SIDELINK COMMUNICATION

CROSS-REFERENCE TO RELATED APPLICATION

The present application is a continuation-in-part of International Patent Application No. PCT/KR2021/017109, filed Nov. 19, 2021, which claims priority to Korean Patent Application Number 10-2021-0160201, filed Nov. 19, 2021, and U.S. Provisional Patent Application No. 63/116,331, filed Nov. 20, 2020, the entire contents of which are incorporated herein for all purposes by these references

BACKGROUND OF THE PRESENT DISCLOSURE

Field of the Present Disclosure

The present disclosure relates to a sidelink communication technique, and more particularly, to a technique for resource sensing and selection for transmission of a paging message.

Description of Related Art

A Fifth-Generation (5G) communication system (e.g., New Radio (NR) communication system) which utilizes a frequency band higher than a frequency band of a Fourth-Generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications may be established, and communications between the vehicles may be performed using the sidelink channels. Sidelink communication may be performed using configured grant (CG) resources. The CG resources may be periodically configured, and periodic data (e.g., periodic sidelink data) may be transmitted using the CG resources.

Meanwhile, when a resource allocation (RA) mode 2 is used, it is necessary to configure a sidelink resource for transmitting a paging message and/or a wake-up signal. When a paging message and/or a wake-up signal is transmitted in a preconfigured sidelink resource without considering a current resource occupancy state, a collision may occur in transmission of the paging message and/or the wake-up signal. In the instant case, energy efficiency and reception performance in sidelink communication may deteriorate.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and an apparatus for transmission of a paging message in sidelink communication.

A method of a transmitting terminal, according to various exemplary embodiments of the present disclosure for achieving the above-described objective, may include: receiving window configuration information from a base station; determining paging (P) candidate resources by performing a first resource sensing operation for transmission of a paging message within an A window indicated by the window configuration information; selecting a P transmission resource from among the P candidate resources within a B window indicated by the window configuration information, and performing a second resource sensing operation for transmission of data associated with the paging message; and transmitting the paging message to a receiving terminal using the P transmission resource.

The operation method may further include: selecting a data (D) transmission resource from among D candidate resources within a C window indicated by the window configuration information; and transmitting the data to the receiving terminal using the D transmission resource, wherein the D candidate resources are determined by the second resource sensing operation.

The A window, the B window, and the C window may be configured independently of each other.

The window configuration information may include time resource information of the A window, time resource information of the B window, and time resource information of the C window.

A first window interval may be configured between the A window and the B window, a second window interval may be configured between the B window and the C window, and time resource information of the first window interval and time resource information of the second window interval may be included in the window configuration information.

The window configuration information may be configured for each resource pool, and first window configuration information and second window configuration information may be configured for one resource pool.

One window configuration information among the first window configuration information and the second window configuration information may be used, and the one window configuration information may be determined according to a condition based on at least one of a size of transmission data, a required latency, a priority per data, or a priority per sidelink service.

The operation method may further include: when the first resource sensing operation is completed before a reference time configured by the base station, early terminating the A window.

The B window may start at an early termination time of the A window or a time after a window interval from the early termination time of the A window.

The A window may be early terminated when one or more conditions are satisfied, and the one or more conditions may be determined based on at least one of a size of transmission data, a required latency, a priority per data, or a priority per sidelink service.

When an early termination operation of the A window is enabled by the base station, the window may be early terminated.

A method of a transmitting terminal, according to various exemplary embodiments of the present disclosure for achieving the above-described objective, may include: receiving window configuration information from a base station; performing a first resource sensing operation for transmission of a paging message and a second resource sensing operation for transmission of data associated with the paging message within a window #1 indicated by the window configuration information; selecting a paging (P) transmission resource from P candidate resources determined by the first resource sensing operation within a window #2 indicated by the window configuration information; selecting a data (D) transmission resource from D candidate resources determined by the second resource sensing operation within the window #2; transmitting the paging message to a receiving terminal in the P transmission resource; and transmitting the data to the receiving terminal in the D transmission resource.

When the first resource sensing operation and the second resource sensing operation are completed before a first reference time configured by the base station, the window #1 may be terminated early.

The window #2 may start at an early termination time of the window #1 or a time after a window interval from the early termination time of the window #1.

The window #1 may be early terminated when one or more conditions are satisfied, and the one or more conditions may be determined based on at least one of a size of transmission data, a required latency, a priority per data, or a priority per sidelink service.

When at least one operation of the first resource sensing operation and the second resource sensing operation is not completed within a second reference time configured by the base station, the window #1 may be reconfigured, and the at least one operation may be performed within the reconfigured window #1.

The reconfigured window #1 may start from the second reference time or a time after an offset configured by the base station from the second reference time.

The window configuration information may include time resource information of the window #1 and time resource information of the window #2, and the window #1 and the window #2 may be configured independently of each other.

The window configuration information may be configured for each resource pool, and first window configuration information and second window configuration information may be configured for one resource pool.

One window configuration information among the first window configuration information and the second window configuration information may be used, and the one window configuration information may be determined according to a condition based on at least one of a size of transmission data, a required latency, a priority per data, or a priority per sidelink service.

According to an exemplary embodiment of the present disclosure, a window (e.g., a resource sensing window and/or a resource selection window) for a paging procedure in a sidelink may be configured independently. For example, a transmitting terminal may perform a resource sensing operation for paging message transmission in an A window, may perform a resource selection operation for paging message transmission and a resource sensing operation for data transmission in a B window, and may perform a resource selection operation for data transmission in a C window. Accordingly, a transmission collision of a paging message in sidelink communication may be prevented. Furthermore, the window may be terminated early, and thus the efficiency of using sidelink resources may be improved. Furthermore, the window may be reconfigured, and accordingly, a transmission success probability of the paging message may be improved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
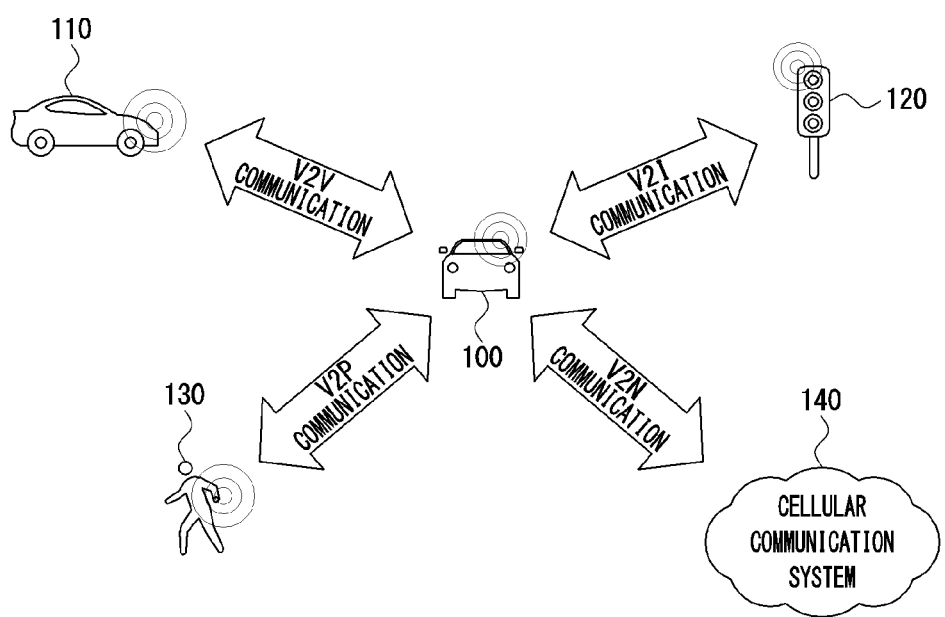
FIG. 1 is a conceptual diagram illustrating V2X communication scenarios.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Because the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the other hand, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In exemplary embodiments of the present disclosure, '(re)transmission' may refer to 'transmission', 'retransmission', or 'transmission and retransmission', '(re)configuration' may refer to 'configuration', 'reconfiguration', or 'configuration and reconfiguration', '(re)connection' may refer to 'connection', 'reconnection', or 'connection and reconnection', and '(re)access' may refer to 'access', 're-access', or 'access and re-access'.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in an exemplary embodiment of the present disclosure are only used to describe specific exemplary embodiments of the present disclosure, and are not intended to limit the present disclosure. The singular expression includes the plural expression unless the context clearly dictates otherwise. In an exemplary embodiment of the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein include same meaning as commonly understood by one of ordinary skill in the art to which the present disclosure belongs. Terms that are generally used and have been in dictionaries should be construed as having meanings matched with contextual meanings in the art. In the present description, unless defined clearly, terms are not necessarily construed as having formal meanings.

Hereinafter, forms of the present disclosure will be described in detail with reference to the accompanying drawings. In describing the present disclosure, to facilitate the entire understanding of the present disclosure, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In the instant case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In the instant case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may be configured to generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In the instant case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
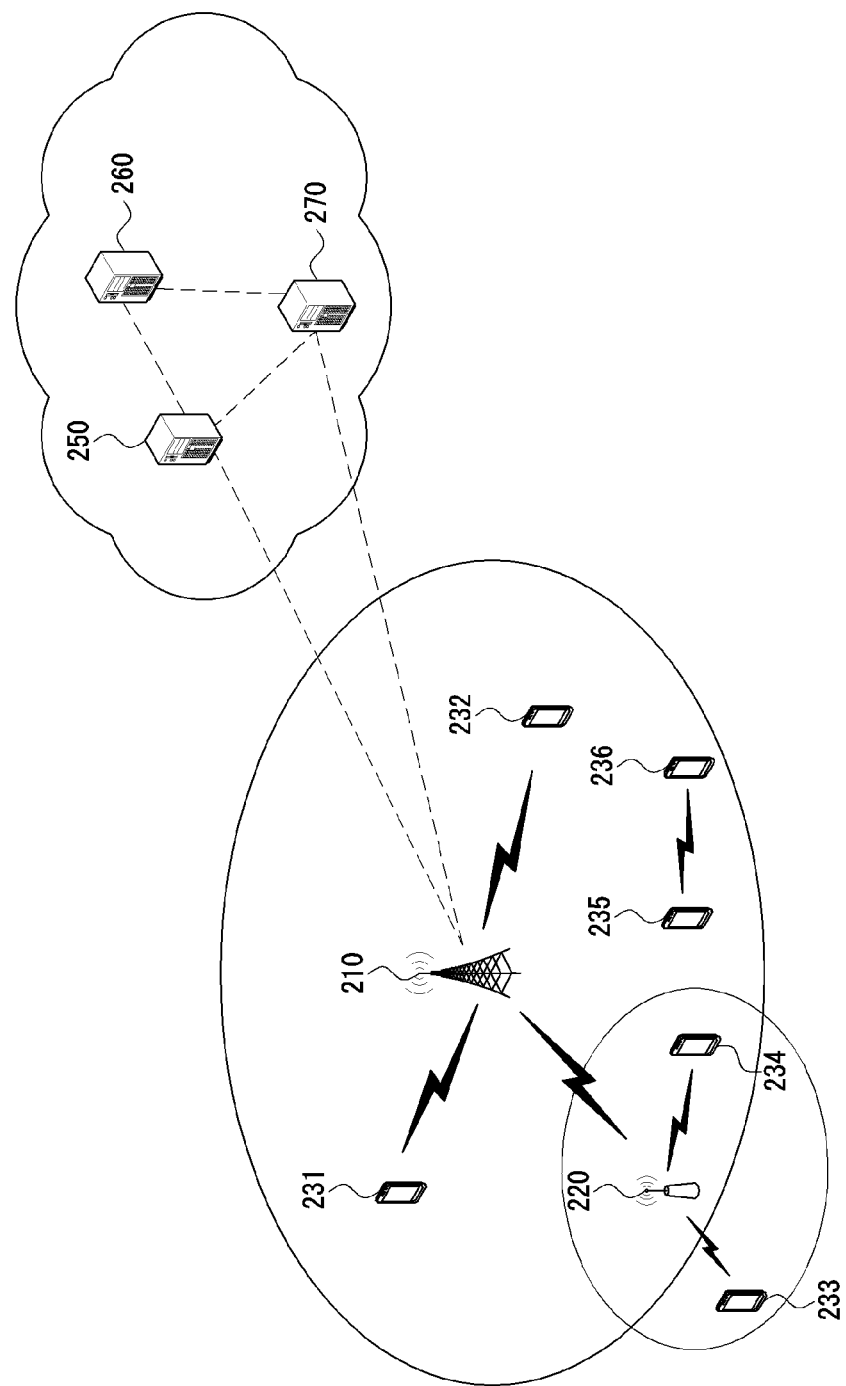
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

Furthermore, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) including the cellular communication system may perform communications by use of at least one communication technology among a Code Division Multiple Access (CDMA) technology, a Time Division Multiple Access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) including the cellular communication system may be configured as follows.

Figure 3:
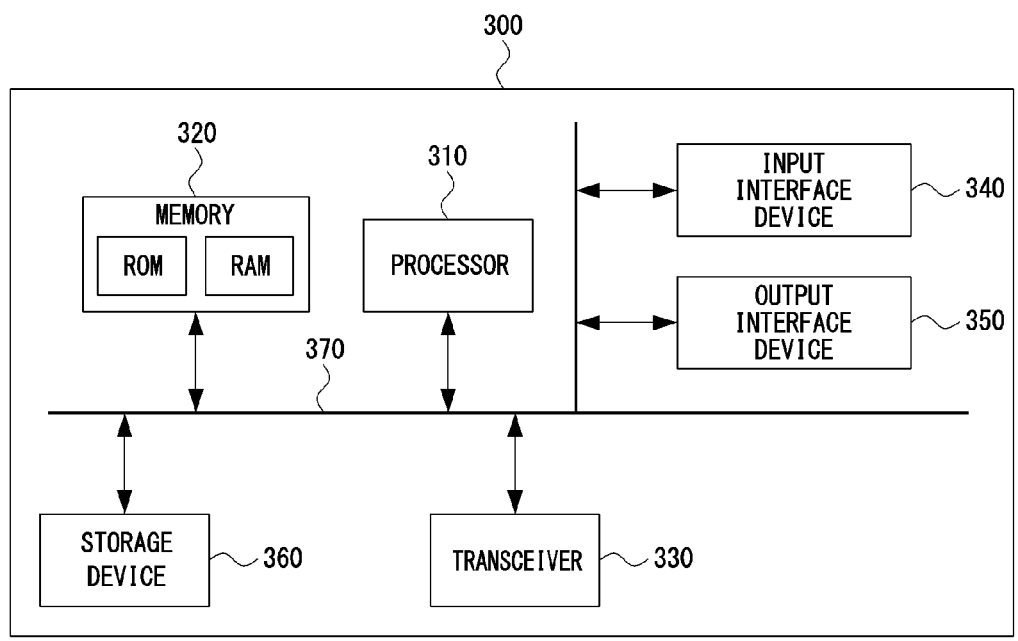
FIG. 3 is a conceptual diagram illustrating an exemplary embodiment of a communication node forming a cellular communication system.

FIG. 3 is a conceptual diagram illustrating an exemplary embodiment of a communication node forming a cellular communication system.

As shown in FIG. 3, a communication node 300 may include at least one processor 310, a memory 320, and a transceiver 330 connected to a network for performing communications. Also, the communication node 300 may further include an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
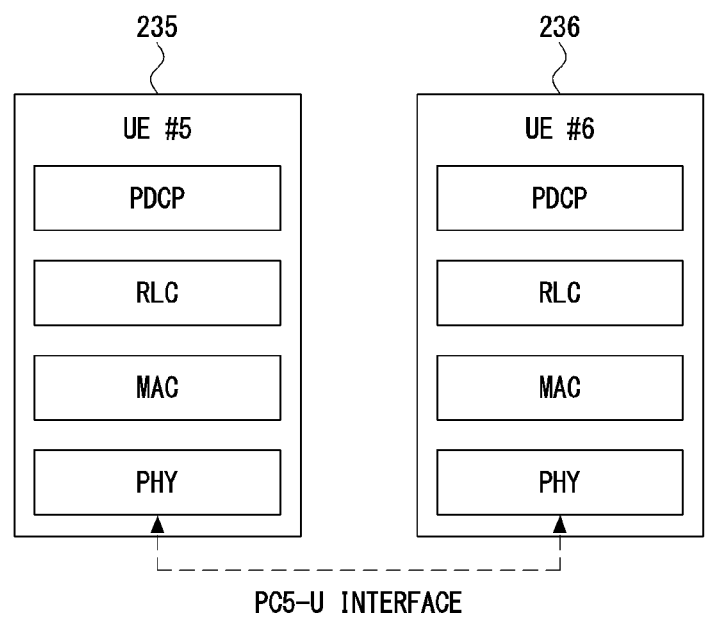
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
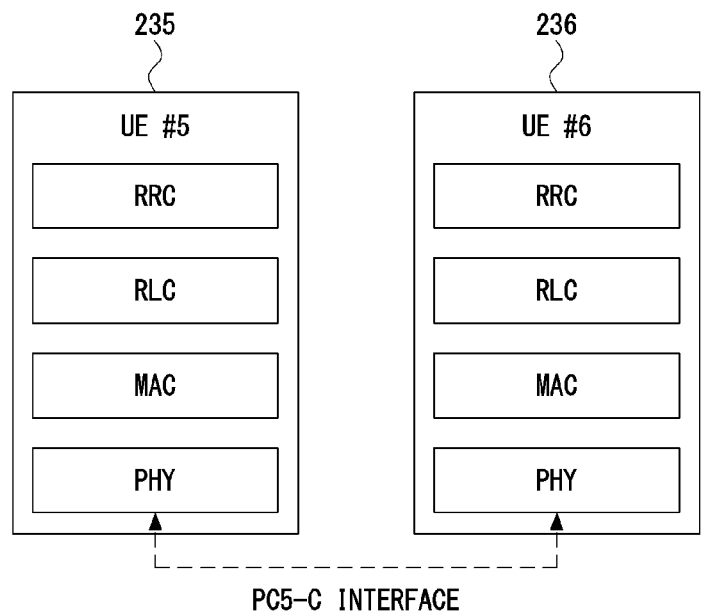
FIG. 5 is a block diagram illustrating a first exemplary embodiment of a control plane protocol stack of a UE performing sidelink communication.
Figure 6:
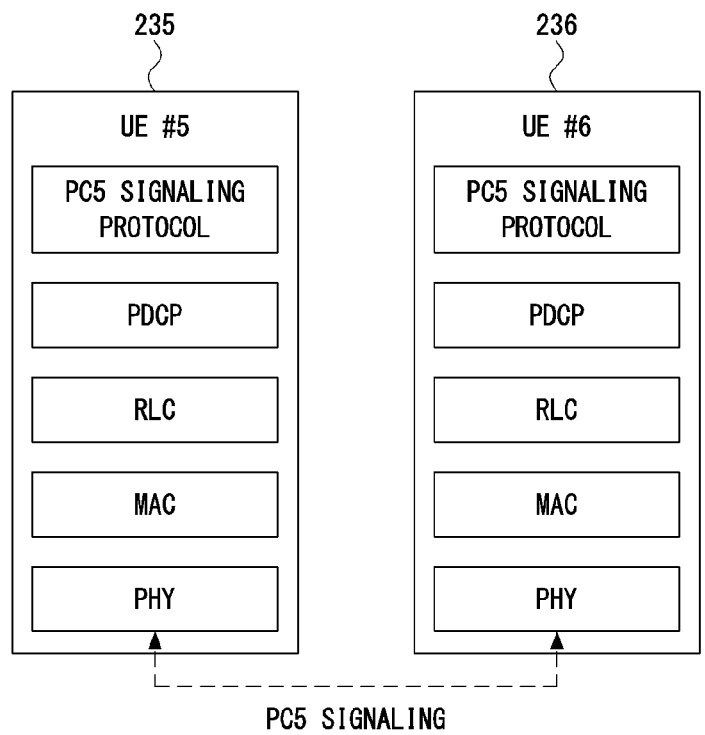
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIG. 5 and FIG. 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In the instant case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In the instant case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In the instant case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In the instant case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, sidelink communication methods will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments of the present disclosure, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell-specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. Furthermore, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single-SCI scheme or a multi-SCI scheme. When the single-SCI scheme is used, data transmission (e.g., sidelink data transmission, sidelink-shared channel (SL-SCH) transmission) may be performed based on one SCI (e.g., 1st-stage SCI). When the multi-SCI scheme is used, data transmission may be performed using two SCIs (e.g., 1st-stage SCI and 2nd-stage SCI).

The SCI(s) may be transmitted on a PSCCH and/or a PSSCH. When the single-SCI scheme is used, the SCI (e.g., 1st-stage SCI) may be transmitted on a PSCCH. When the multi-SCI scheme is used, the 1st-stage SCI may be transmitted on a PSCCH, and the 2nd-stage SCI may be transmitted on the PSCCH or a PSSCH. The 1st-stage SCI may be referred to as 'first-stage SCI', and the 2nd-stage SCI may be referred to as 'second-stage SCI'. A format of the first-stage SCI may include a SCI format 1-A, and a format of the second-stage SCI may include a SCI format 2-A and a SCI format 2-B.

The 1st-stage SCI may include or more information elements among priority information, frequency resource assignment information, time resource assignment information, resource reservation period information, demodulation reference signal (DMRS) pattern information, 2nd-stage SCI format information, a beta offset indicator, the number of DMRS ports, and modulation and coding scheme (MCS) information. The 2nd-stage SCI may include one or more information elements among a HARQ processor identifier (ID), a redundancy version (RV), a source ID, a destination ID, CSI request information, a zone ID, and communication range requirements.

Meanwhile, a receiving terminal may operate in an RRC inactive mode, RRC idle mode, or sleep mode. When data (e.g., sidelink data) to be transmitted to the receiving terminal exists in a transmitting terminal, the transmitting terminal may transmit a paging message and/or a wake-up signal to the receiving terminal to inform that the data exists. The receiving terminal may receive the paging message and/or the wake-up signal from the transmitting terminal. The receiving terminal may be configured to determine that the data to be transmitted to the receiving terminal exists in the transmitting terminal based on information included in the paging message and/or the wake-up signal.

In the instant case, the operation state of the receiving terminal may transition to an RRC connected state. The receiving terminal operating in the RRC connected state may receive the data from the transmitting terminal. The above-described operations may be performed using sidelink resources configured according to a resource allocation (RA) mode 2. In exemplary embodiments of the present disclosure, the transmitting terminal may refer to a terminal transmitting data, the receiving terminal may refer to a terminal receiving the data, and the receiving terminal may be interpreted as 'one or more receiving terminals'. Methods for transmitting and receiving a paging message will be described in the following exemplary embodiments of the present disclosure. The methods for transmitting and receiving a paging message may be applied identically or similarly to transmission and reception of a wake-up signal. That is, in the exemplary embodiments of the present disclosure, a paging message may be interpreted as a wake-up signal. A paging message may be used as a meaning including a wake-up signal. For example, a paging message may include a wake-up signal.

Exemplary Embodiment 1

A window in which a resource sensing operation for transmission of a paging message is performed (hereinafter referred to as 'A window'), a window in which a resource selection operation for transmission of the paging message and a resource sensing operation for transmission of data (e.g., data associated with the paging message) are performed (hereinafter referred to as 'B window'), and a window in which a resource selection operation for transmission of the data is performed (hereinafter referred to as 'C window') may be independently configured.

Figure 7:
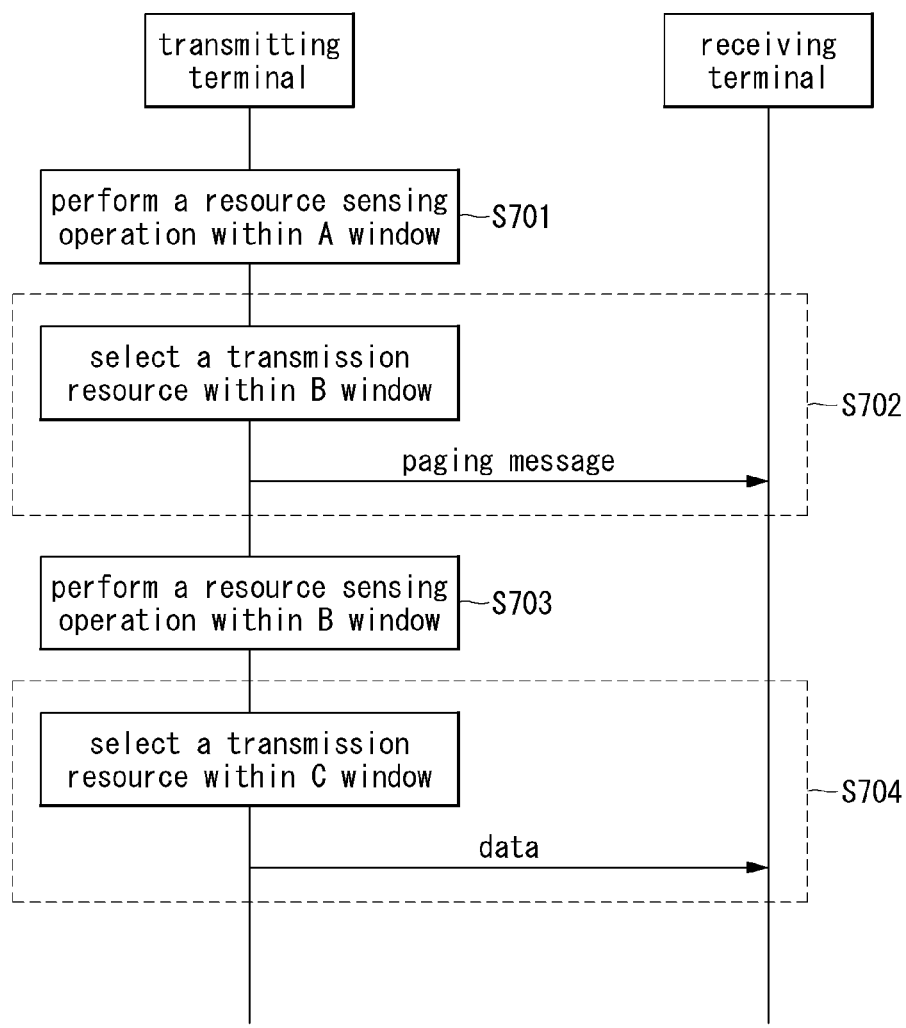
FIG. 7 is a sequence chart illustrating a first exemplary embodiment of a method for transmitting and receiving data according to a paging procedure in sidelink communication.

FIG. 7 is a sequence chart illustrating a first exemplary embodiment of a method for transmitting and receiving data according to a paging procedure in sidelink communication.

As shown in Table 7, a data transmission/reception method according to a paging procedure may include four steps (e.g., step S701, step S702, step S703, and step S704). As a previous step of the four steps, a transmitting terminal and/or a receiving terminal may receive window configuration information from a base station. The window configuration information may include configuration information of an A window, configuration information of a B window, and/or configuration information of a C window. The window configuration information may be configured using at least one of system information, an RRC message, a MAC control element (CE), or control information (e.g., downlink control information (DCI)).

When there is data to be transmitted to the receiving terminal, the transmitting terminal may perform a transmission operation of a paging message. For example, the transmitting terminal may perform a resource sensing operation within the A window (S701). The transmitting terminal may be configured to determine (e.g., detect or sense) paging (P) candidate resource(s) by performing the resource sensing operation. The transmitting terminal may select a P transmission resource from among the P candidate resource(s) within the B window, and may transmit a paging message in the selected P transmission resource (S702). The receiving terminal may receive the paging message from the transmitting terminal, and may be configured to determine that data exists in the transmitting terminal based on information included in the paging message. In the instant case, an operation state of the receiving terminal may transition from an RRC inactive mode, RRC idle mode, or sleep mode to an RRC connected mode.

After transmitting the paging message, the transmitting terminal may perform a resource sensing operation for data transmission within the B window (S703). That is, both the resource selection operation for transmission of the paging message and the resource sensing operation for data transmission may be performed within the B window. The paging message may be transmitted to indicate the existence of the data. The data in the step S703 may be associated with the paging message in the steps S701 and S702. The transmitting terminal may be configured to determine (e.g., detect or sense) data (D) candidate resource(s) by performing the resource sensing operation. The transmitting terminal may select a D transmission resource from among the D candidate resource(s) within the C window, and may transmit the data (e.g., sidelink data) in the selected D transmission resource (S704). The receiving terminal may receive the data from the transmitting terminal.

The above-described four steps may be performed as follows. In the step S701, when data to be transmitted to the receiving terminal occurs, the A window may be started. The transmitting terminal may detect usable resource(s) (e.g., P candidate resource(s)) by performing the resource sensing operation within the A window. In the step S702, the B window may be configured, and the transmitting terminal may select the P transmission resource from among the P candidate resource(s) within the B window, and may transmit the paging message using the P transmission resource.

The receiving terminal may receive the paging message from the transmitting terminal by performing a monitoring operation in the B window. The receiving terminal may identify that data to be transmitted to the receiving terminal exists in the transmitting terminal based on the paging message. In the instant case, the receiving terminal may perform a PSCCH monitoring operation to receive SCI for scheduling the data.

In the step S703, the transmitting terminal may detect D candidate resource(s) by performing the resource sensing operation within the B window. In the step S704, the C window may be configured, and the transmitting terminal may select the D transmission resource from among the D candidate resource(s) within the C window, and may transmit the data using the D transmission resource. The receiving terminal may receive the data from the transmitting terminal.

A time resource and/or a frequency resource of each of the A window, B window, and C window may be configured within a resource pool. The A window, B window, and C window may be configured as follows.

Figure 8:
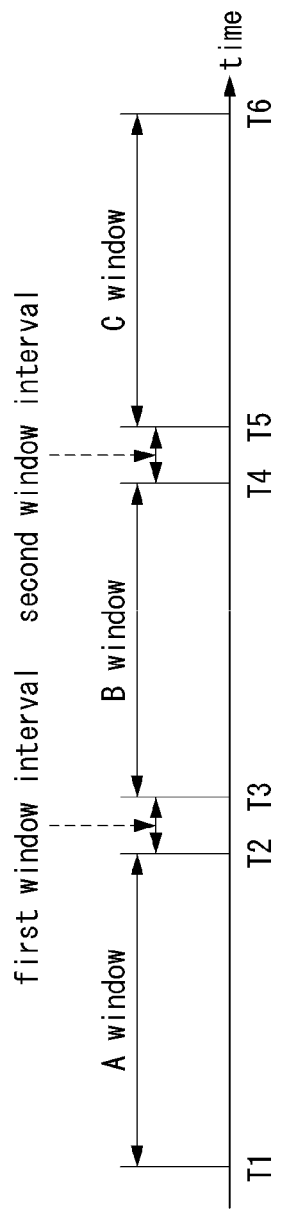
FIG. 8 is a conceptual diagram illustrating a first exemplary embodiment of windows for a resource sensing operation and/or a resource selection operation in sidelink communication.

FIG. 8 is a conceptual diagram illustrating a first exemplary embodiment of windows for a resource sensing operation and/or a resource selection operation in sidelink communication.

As shown in FIG. 8, the A window may be configured in a time resource from T1 to T2, the B window may be configured in a time resource from T3 to T4, and the C window may be configured in a time resource from T5 to T6. The receiving terminal may perform a PSCCH monitoring operation from a start time (i.e., T3) of the B window. T1 to T6 may mean continuous time or discontinuous time. Each of T1 to T6 may be expressed as a transmission time interval (TTI), symbol index, subframe index, slot index, or mini-slot index. The symbol index may be an orthogonal frequency division multiplexing (OFDM) symbol index, an orthogonal frequency division multiple access (OFDMA) symbol index, a single carrier (SC)-frequency division multiplexing (FDM) symbol index, or a signal carrier-frequency division multiple access (SC-FDMA) symbol index. Frequency resources of the A window, B window, and C window may be configured to be the same or different from each other. Alternatively, the frequency resources of the A window, B window, and C window may be configured to partially overlap.

A window interval (hereinafter, referred to as 'first window interval') between an end time (i.e., T2) of the A window and a start time (i.e., T3) of the B window may be configured. A window interval (hereinafter referred to as 'second window interval') between an end time (i.e., T4) of the B window and a start time (i.e., T5) of the C window may be configured. The window intervals described above may be configured identically or differently.

The base station may configure one or more information elements defined in Table 3 below, and may transmit the one or more information elements to the terminal(s) (e.g., transmitting terminal and/or receiving terminal) using at least one of system information, RRC message, MAC CE, or control information. The terminal(s) may identify the one or more information elements defined in Table 3 below by receiving at least one of the system information, RRC message, MAC CE, or control information from the base station. Alternatively, one or more information elements defined in Table 3 below may be configured by the transmitting terminal, and the transmitting terminal may transmit the one or more information elements to the receiving terminal using at least one of an RRC message, MAC CE, or control information (e.g., SCI). The receiving terminal may identify the one or more information elements defined in Table 3 below by receiving at least one of the RRC message, MAC CE, or control information from the transmitting terminal.

TABLE 3

| Information element(s) |
| --- |
| Time and/or frequency resource information of A window |
| Time and/or frequency resource information of B window |
| Time and/or frequency resource information of C window |
| First window interval |
| Second window interval |

The A window, B window, and C window may be configured for each resource pool. In exemplary embodiments of the present disclosure, the resource pool may be referred to as 'RP'.

TABLE 4

| Resource pool | A window | B window | C window |
| --- | --- | --- | --- |
| RP #1 | X1 slots | X2 slots | X3 slots |
| RP #1 | X4 slots | X5 slots | X6 slots |
| RP #2 | X7 slots | X8 slots | X9 slots |
| RP #2 | X10 slots | X11 slots | X12 slots |

Referring to Table 4, the A window, B window, and C window for each of the RP #1 and the RP #2 may be independently configured. In Table 4, the A window, B window, and C window may be configured in the same frequency resource. When the A window, B window, and C window are configured in different frequency resources, Table 4 may further include frequency resource information. In the instant case, the frequency resource may be configured in units of subcarriers, subchannels, or resource blocks (RBs). That is, the frequency resource may be represented by subcarrier index(es), subchannel index(es), or RB index(es). A subchannel may include one or more subcarriers or one or more RBs. The RB may be a physical RB (PRB), a virtual RB (VRB), or a common RB (CRB). The frequency resource of each of the A window, B window, and C window may be expressed as a relative location (e.g., offset) from a reference resource within the resource pool.

When two resource pools (e.g., RP #1 and RP #2) are allocated (e.g., configured) in the transmitting terminal, the A window, B window, and C window defined in Table 4 may be configured. In Table 4, each of X1 to X12 may be a natural number. The time resource of each of the A window, B window, and C window may be indicated by the number of slots. Alternatively, the time resource of each of the A window, B window, and C window may be configured in units of TTIs, symbols, subframes, mini-slots, milliseconds, or seconds. The sizes of the time resources of the A window, B window, and C window may be the same or different.

Referring to Table 4, two window configurations may be configured for one resource pool. For example, according to a first window configuration for the RP #1, the time resource of the A window may be configured in X1 slots, the time resource of the B window may be configured in X2 slots, and the time resource of the C window may be configured in X3 slots. According to a second window configuration for the RP #1, the time resource of the A window may be configured in X4 slots, the time resource of the B window may be configured in X5 slots, and the time resource of the C window may be configured in X6 slots.

When a plurality of window configurations exist for one resource pool, the transmitting terminal may use one window configuration among the plurality of window configurations according to specific condition(s). The base station may configure the specific condition(s) to the transmitting terminal and/or the receiving terminal using at least one of system information, RRC signaling, MAC CE, or control information. The specific condition(s) may be defined as shown in Table 5 below.

TABLE 5

|  | Description |
| --- | --- |
| Condition #1 | Size of data to be transmitted from the transmitting terminal to the receiving terminal (e.g., the number of data transmissions) |
| Condition #2 | Required latency |
| Condition #3 | Priority per data |
| Condition #4 | Priority per sidelink service |

For example, when the size of the data to be transmitted from the transmitting terminal to the receiving terminal is greater than or equal to a threshold, the transmitting terminal may select a window configuration including a large time resource from among the plurality of window configurations for one resource pool. When a priority of the data is high or when a required latency is short, the transmitting terminal may select a window configuration including a small time resource from among the plurality of window configurations for one resource pool. When transmission resources for a plurality of data transmissions are required, the transmitting terminal may select a window configuration including a large time resource from among the plurality of window configurations for one resource pool.

TABLE 6

|  | Configuration value |
| --- | --- |
| First window interval (T3-T2) | Y1 |
|  | Y2 |
| Second window interval (T5-T4) | Y3 |
|  | Y4 |

The window intervals shown in Table 8 may be configured as shown in Table 6. Each of Y1 to Y4 may be configured in units of TTIs, symbols, subframes, slots, mini-slots, milliseconds, or seconds. A plurality of configuration values (e.g., two configuration values) may be configured for one window interval. In the instant case, the transmitting terminal may use one configuration value among the plurality of configuration values based on the specific condition(s) defined in Table 5. Alternatively, the first window interval and the second window interval may have the same configuration value (e.g., time resource).

Figure 9:
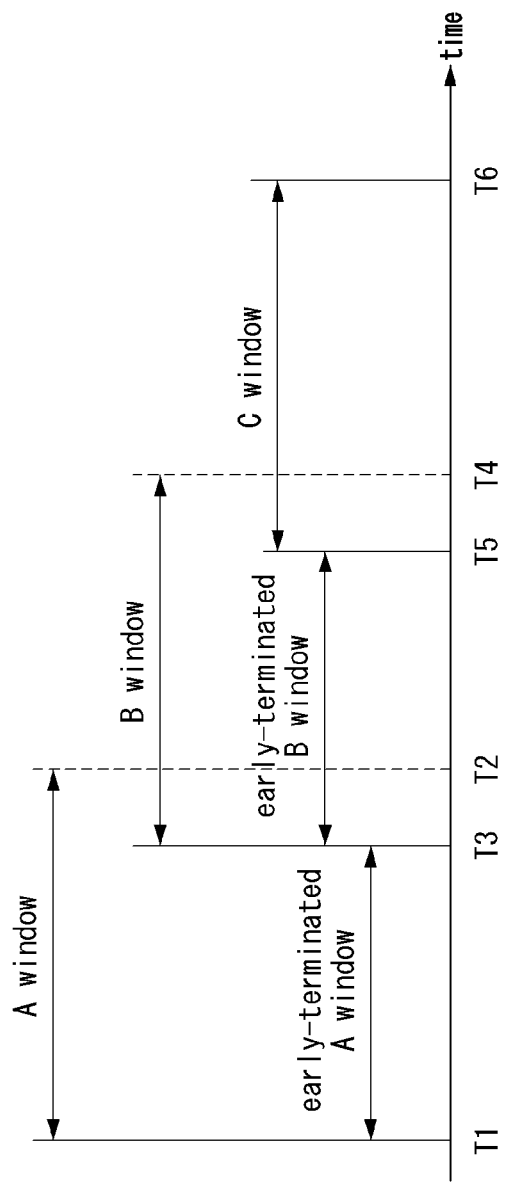
FIG. 9 is a conceptual diagram illustrating a second exemplary embodiment of windows for a resource sensing operation and/or a resource selection operation in sidelink communication.

FIG. 9 is a conceptual diagram illustrating a second exemplary embodiment of windows for a resource sensing operation and/or a resource selection operation in sidelink communication.

As shown in FIG. 9, the A window, B window, and/or C window may be early terminated. The A window may be configured in a time resource from T1 to T2, and may be early terminated at T3 before T2. For example, when the resource sensing operation is completed before T3, the A window may be early terminated at T3. T3 may be used as a reference value for early termination of the A window. When the A window is early terminated, the B window may start from the early termination time (i.e., T3) of the A window, and the transmitting terminal may perform the resource selection operation for paging message transmission and the resource sensing for data transmission within the B window. Alternatively, when the first window interval is configured, the B window may be started after a time (T3+ the first window interval).

The B window may be configured in a time resource from T3 to T4, and may be early terminated at a specific time before T4. For example, when the resource selection operation for paging message transmission and the resource sensing operation for data transmission are completed before the specific time, the B window may be early terminated at the specific time. The specific time may be used as a reference value for early termination of the B window. When the B window is early terminated, the C window may be started from the early termination time (i.e., the specific time) of the B window, and the transmitting terminal may perform the resource selection operation within the C window. Alternatively, when the second window interval is configured, the C window may be started after a time (the specific time +the second window interval). The above-described early termination operation of the window may be applied in the same or similar manner to the C window. The early termination time of the window may be configured as shown in Table 7 below. The base station may transmit configuration information of the early termination times to the transmitting terminal and/or the receiving terminal using at least one of system information, RRC message, MAC CE, or control information.

TABLE 7

| Resource pool | A window | B window | C window | Early termination time of window |
| --- | --- | --- | --- | --- |
| RP #1 | X1 slots | X2 slots | X3 slots | Z1 slots |
| RP #1 | X4 slots | X5 slots | X6 slots | Z2 slots |
| RP #2 | X7 slots | X8 slots | X9 slots | Z3 slots |
| RP #2 | X10 slots | X11 slots | X12 slots | Z4 slots |

The transmitting terminal and/or receiving terminal may operate according to the configurations defined in Table 7. For example, the transmitting terminal may perform the resource sensing operation in the A window within the RP #1. When the resource sensing operation is completed within (X1-Z1) slots, the transmitting terminal may terminate the A window early, and may perform the resource selection operation for paging message transmission and the resource sensing operation for data transmission in the B window configured in X2 slots. When the first window interval is configured, the B window may be started after the first window interval from the early termination time of the A window.

When the resource selection operation for paging message transmission and the resource sensing operation for data transmission are completed within (X2-Z1) slots, the transmitting terminal may early terminate the B window, and may perform the resource selection operation for data transmission in the C window configured in X3 slots. When the second window interval is configured, the C window may be started after the second window interval from the early termination time of the B window.

The early termination operation of the window may be enabled or disabled by the base station. For example, when the base station transmits information indicative of enabling the early termination operation of the window, the transmitting terminal may perform the early termination operation of the window. On the other hand, when the base station transmits information indicative of disabling the early termination operation of the window, the transmitting terminal may not perform the early termination operation of the window. The information indicative of enabling or disabling the early termination operation of the window may be transmitted through at least one of system information, an RRC message, a MAC CE, or control information.

The early termination operation of the window may be performed when specific condition(s) are satisfied. The specific condition(s) may be the specific condition(s) defined in Table 5. The specific condition(s) may be configured by at least one of system information, RRC message, MAC CE, or control information. For example, when a priority of the data is higher than a reference priority (e.g., reference priority configured by higher layer signaling) or when a required latency is shorter than a reference latency (e.g., reference latency configured by higher layer signaling), the transmitting terminal may perform the early termination operation of the window.

Exemplary Embodiment 2

Two windows may be operated for paging message transmission and data transmission. The two windows may be configured as follows.

Scheme 1: a window #1 in which a resource sensing operation and a resource selection operation for paging message transmission are performed and a window #2 in which a resource sensing operation and a resource selection operation for data transmission are performed Scheme 2: a window #1 in which a resource sensing operation for paging message transmission and data transmission is performed and a window #2 in which a resource selection operation for paging message transmission and data transmission is performed In the following exemplary embodiment of the present disclosure, a window #1 may mean the window #1 according to Scheme 1 or Scheme 2, and a window #2 may mean the window #2 according to Scheme 1 or Scheme 2.

A time offset from a start time to an end time of the window (e.g., window #1 and/or window #2) may be configured as shown in Table 8 below.

TABLE 8

| | Time offset |
|---|---|
| Window #1 | X |
| Window #2 | Y |

The base station may transmit configuration information of the time offsets to the transmitting terminal and/or the receiving terminal using at least one of system information, RRC message, MAC CE, or control information. In Table 8, each of X and Y may be configured in units of TTIs, symbols, subframes, slots, mini-slots, milliseconds, or seconds. When Scheme 1 is used, the transmitting terminal may select a transmission resource within X from a start time of the resource sensing operation, and may transmit a paging message using the selected transmission resource. The above-described resource sensing operation and resource selection operation for paging message transmission may be performed within the window #1. Furthermore, the transmitting terminal may select a transmission resource within Y from the start time of the resource sensing operation, and may transmit data using the selected transmission resource. The above-described resource sensing operation and resource selection operation for data transmission may be performed within the window #2.

When Scheme 2 is used, the transmitting terminal may perform the resource sensing operation for paging message transmission and data transmission within X from a start time of the window #1. Furthermore, the transmitting terminal may perform the resource selection operation for paging message transmission and data transmission within Y from a start time of the window #2.

Figure 10:
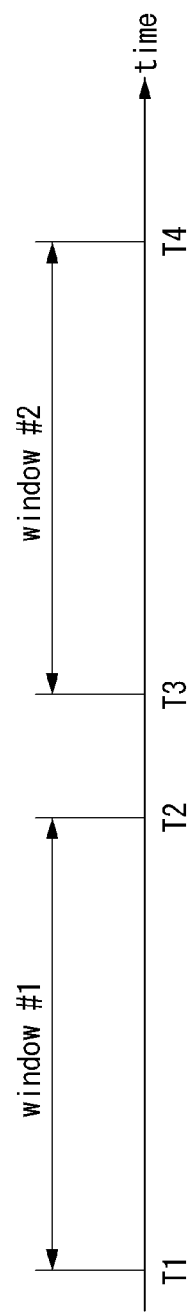
FIG. 10 is a conceptual diagram illustrating a third exemplary embodiment of windows for a resource sensing operation and/or a resource selection operation in sidelink communication.

FIG. 10 is a conceptual diagram illustrating a third exemplary embodiment of windows for a resource sensing operation and/or a resource selection operation in sidelink communication.

As shown in FIG. 10, the window #1 may be configured in a time resource from T1 to T2. The time resource from T1 to T2 may be X (i.e., time offset) defined in Table 8. When the operations in the window #1 are completed before a preconfigured time (e.g., reference time or specific time), the window #1 may be early terminated. The window #2 may be configured in a time resource from T3 to T4. The time resource from T3 to T4 may be Y (i.e., time offset) defined in Table 8. In Scheme 1, the receiving terminal may perform a PSCCH monitoring operation from T3 when a paging message is received within the window #1. When the operations in the window #2 are completed before a preconfigured time (e.g., reference time or specific time), the window #2 may be terminated early.

The time offset of the window #1 may be configured to be equal to the time offset of the window #2. In the instant case, a single time offset (e.g., common time offset) may be used for the window #1 and the window #2. A plurality of time offsets may be configured for each of the window #1 and the window #2. In the instant case, the transmitting terminal may select one time offset from among the plurality of time offsets based on specific condition(s) and may use the selected one time offset. The specific condition(s) may be the specific condition(s) defined in Table 5. The specific condition(s) may be configured by at least one of system information, RRC message, MAC CE, or control information.

Figure 11:
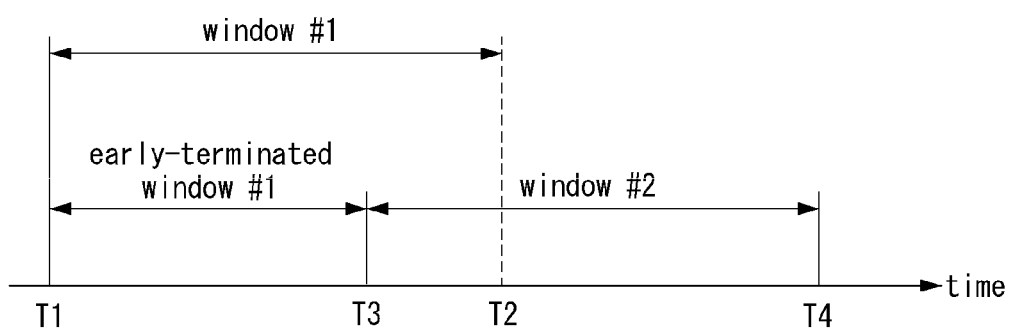
FIG. 11 is a conceptual diagram illustrating a fourth exemplary embodiment of windows for a resource sensing operation and/or a resource selection operation in sidelink communication.

FIG. 11 is a conceptual diagram illustrating a fourth exemplary embodiment of windows for a resource sensing operation and/or a resource selection operation in sidelink communication.

As shown in FIG. 11, the window #1 may be configured in a time resource from T1 to T2. When the operations in the window #1 are completed before T3, the window #1 may be early terminated at T3. The window #2 may be started from the early termination time (i.e., T3) of the window #1. Alternatively, the window #2 may be started after a preconfigured window interval from the early termination time (i.e., T3) of the window #1. In Scheme 1, the receiving terminal may perform a PSCCH monitoring operation from T3 when a paging message is received. The PSCCH monitoring operation may be performed immediately after receiving the paging message.

The reference time (e.g., T3) at which the early termination operation of the window is triggered may be preconfigured. The base station may inform the reference time for the early termination operation of the window to the transmitting terminal and/or the receiving terminal using at least one of system information, RRC message, MAC CE, or control information. When the operations in the window #1 are not completed within the reference time, the transmitting terminal may not early terminate the window #1. When the operations in the window #1 are completed within the reference time, the transmitting terminal may early terminate the window #1.

On the other hand, in Scheme 1 of the exemplary embodiment 2, when the resource sensing operation is not completed until a specific time, the window may be initialized. Furthermore, in Scheme 2 of the exemplary embodiment 2, when the resource sensing operation and/or the resource selection operation are not completed until a specific time, the window may be initialized. An initialization offset for initialization of the window may be configured as shown in Table 9 below.

TABLE 9

|  | Time offset | Initialization offset |
|---|---|---|
| Window #1 | X | F1 |
| Window #2 | Y | F2 |

The base station may transmit configuration information of the initialization offsets to the transmitting terminal and/or the receiving terminal using at least one of system information, RRC message, MAC CE, or control information. The initialization offset for the window #1 may be configured independently of the initialization offset for the window #2. Alternatively, the initialization offset for the window #1 may be configured to be equal to the initialization offset for the window #2. A plurality of initialization offsets may be configured for each window in one resource pool. In the instant case, the transmitting terminal may select one initialization offset from among the plurality of initialization offsets based on specific condition(s) (e.g., specific condition(s) defined in Table 5), and may use the one initialization offset. In Table 9, each of F1 and F2 may be configured in units of TTIs, symbols, subframes, slots, mini-slots, milliseconds, or seconds.

Figure 12:
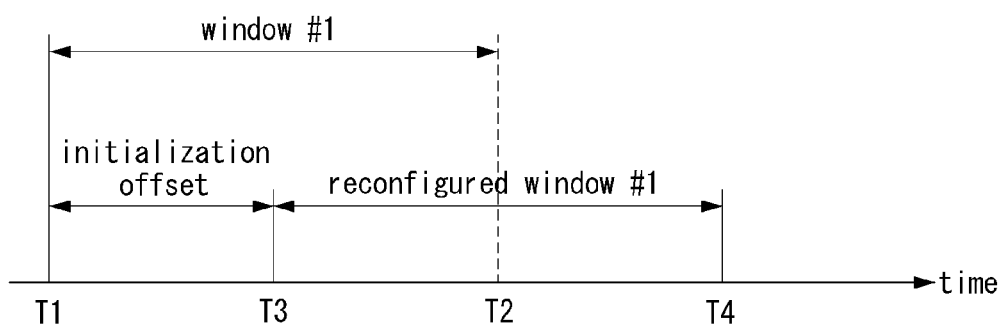
FIG. 12 is a conceptual diagram illustrating a fifth exemplary embodiment of windows for a resource sensing operation and/or a resource selection operation in sidelink communication.

FIG. 12 is a conceptual diagram illustrating a fifth exemplary embodiment of windows for a resource sensing operation and/or a resource selection operation in sidelink communication.

As shown in FIG. 12, when Scheme 1 is used, the transmitting terminal may perform the resource sensing operation and the resource selection operation for paging message transmission in the window #1. The window #1 may be configured in a time resource from T1 to T2. The length of the time resource from T1 to T2 may correspond to X defined in Table 9. The resource sensing operation may start at T1. T3 may be a time at which the resource sensing operation should be completed. When the resource sensing operation is not completed within T3, the transmitting terminal may reconfigure the window #1 based on T3. The reconfigured window #1 may start at T3. A value of (T3−T1) may be F1 (i.e., initialization offset) defined in Table 9. The length of the reconfigured window #1 may be the same as the length of the previous window #1, and the start time of the reconfigured window #1 may be different from the start time of the previous window #1. The above-described operation may be equally or similarly applied to the window #2.

When Scheme 2 is used, the transmitting terminal may perform the resource sensing operation for paging message transmission and the resource sensing operation for data transmission in the window #1. The above-described resource sensing operation(s) may start at T1. T3 may be a time at which the resource sensing operation(s) should be completed. When at least one resource sensing operation is not completed within T3, the transmitting terminal may reconfigure the window #1 based on T3. In the reconfigured window #1, all the resource sensing operations or at least one resource sensing operation not completed in the previous window #1 may be performed. The reconfigured window #1 may start at T3. A value of (T3−T1) may be F1 (i.e., initialization offset) defined in Table 9. The length of the reconfigured window #1 may be the same as the length of the previous window #1, and the start time of the reconfigured window #1 may be different from the start time of the previous window #1. The above-described operation may be equally or similarly applied to the window #2.

Meanwhile, in the exemplary embodiment based on Table 9 and FIG. 12, a sensing termination offset may be additionally considered. The initialization operation of the window may be performed after a sensing termination offset from an end time of the resource sensing operation. The sensing termination offsets may be configured as shown in Table 10 below.

TABLE 10

|  | Time offset | Sensing termination offset | Initialization offset |
|---|---|---|---|
| Window #1 | X | X1 | F1 |
| Window #2 | Y | Y1 | F2 |

The base station may transmit configuration information of the sensing termination offsets to the transmitting terminal and/or the receiving terminal using at least one of system information, RRC message, MAC CE, or control information. The sensing terminal offset for the window #1 may be configured independently of the sensing termination offset for the window #2. Alternatively, the sensing termination offset for the window #1 may be configured to be equal to the sensing termination offset for the window #2.

A plurality of sensing termination offsets may be configured for each window in one resource pool. In the instant case, the transmitting terminal may select one sensing terminal offset from among the plurality of sensing termination offsets based on specific condition(s) (e.g., specific condition(s) defined in Table 5), and use the one sensing termination offset. In Table 10, each of X1 and Y1 may be configured in units of TTIs, symbols, subframes, slots, mini-slots, milliseconds, or seconds.

Figure 13:
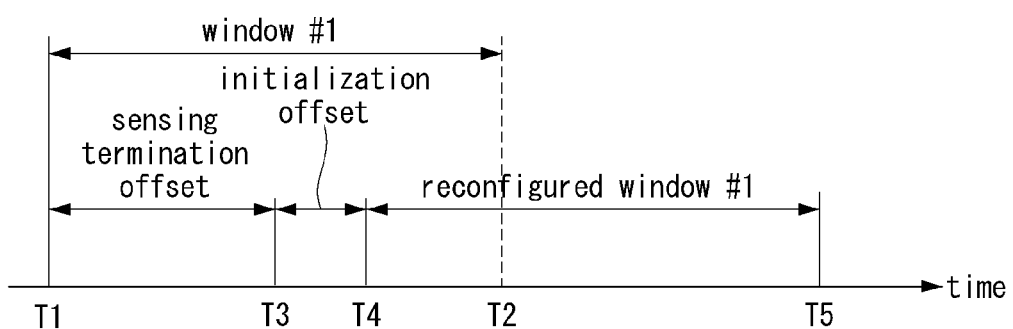
FIG. 13 is a conceptual diagram illustrating a sixth exemplary embodiment of windows for a resource sensing operation and/or a resource selection operation in sidelink communication.

FIG. 13 is a conceptual diagram illustrating a sixth exemplary embodiment of windows for a resource sensing operation and/or a resource selection operation in sidelink communication.

As shown in FIG. 13, when Scheme 1 is used, the transmitting terminal may perform the resource sensing operation and the resource selection operation for paging message transmission in the window #1. The window #1 may be configured in a time resource from T1 to T2. The length of the time resource from T1 to T2 may correspond to X defined in Table 10. The resource sensing operation may start at T1. T3 may be a time at which the resource sensing operation should be completed. When the resource sensing operation is not completed within T3, the transmitting terminal may reconfigure the window #1 based on T4, which is a time after an initialization offset (e.g., F1 defined in Table 10) from T3. The reconfigured window #1 may start at T4. A value of (T3−T1) may be X1 (i.e., sensing termination offset) defined in Table 10, and a value of (T4−T3) may be F1 (i.e., initialization offset) defined in Table 10. The above-described operation may be equally or similarly applied to the window #2.

When Scheme 2 is used, the transmitting terminal may perform the resource sensing operation for paging message transmission and the resource sensing operation for data transmission in the window #1. The above-described resource sensing operation(s) may start at T1. T3 may be a time at which the resource sensing operation(s) should be completed. When at least one resource sensing operation is not completed within T3, the transmitting terminal may reconfigure the window #1 based on T4, which is a time after the initialization offset (e.g., F1 defined in Table 10) from T3. In the reconfigured window #1, all the resource sensing operations or at least one resource sensing operation not completed in the previous window #1 may be performed. The reconfigured window #1 may start at T4. A value of (T3−T1) may be X1 (i.e., sensing termination offset) defined in Table 10, and a value of (T4−T3) may be F1 (i.e., initialization offset) defined in Table 10. The above-described operation may be equally or similarly applied to the window #2.

Meanwhile, in the above-described exemplary embodiments of the present disclosure, the configuration value (e.g., values defined in Tables 3 to 10) may be expressed as an offset based on a start time of the resource sensing operation. Alternatively, the reference time of the offset may be a time other than the start time of the resource sensing operation (e.g., a time preconfigured by the base station). Among the values defined in Tables 3 to 10, some values may be fixed values in the communication system, and the remaining values may be configured by at least one of system information, RRC message, MAC CE, or control information. The values defined in Tables 3 to 10 may be cell-specific information (e.g., common information for a plurality of terminals within one cell), RP-specific information (e.g., common information for one RP), or terminal-specific information. The values defined in Tables 3 to 10 may be configured independently according to the resource pool, service type, priority, power saving operation state, quality of service (QoS) parameter (e.g., reliability, latency), and/or terminal type (e.g., vehicle (V)-UE or pedestrian (P)-UE). The values defined in Tables 3 to 10 may be implicitly indicated based on preconfigured parameter(s).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or may be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of a transmitting user equipment (UE), the method comprising:
   receiving, from a base station, window configuration information including a first parameter indicating an A window, a second parameter indicating a B window and a third parameter indicating a C window;
   determining paging (P) candidate resources by performing a first resource sensing operation for transmission of a paging message within the A window indicated by the window configuration information;
   selecting a P transmission resource from among the P candidate resources within the B window indicated by the window configuration information, and performing a second resource sensing operation for transmission of data associated with the paging message;
   selecting a data (D) transmission resource from among D candidate resources within the C window indicated by the window configuration information;
   transmitting the paging message to a receiving UE using the P transmission resource; and
   transmitting the data to the receiving UE using the D transmission resource, wherein the D candidate resources are determined by the second resource sensing operation,
   wherein the A window, the B window, and the C window are configured independently of each other.

2. The method of claim 1, wherein the window configuration information includes time resource information of the A window, time resource information of the B window, and time resource information of the C window.

3. The method of claim 1, wherein a first window interval is configured between the A window and the B window, a second window interval is configured between the B window and the C window, and time resource information of the first window interval and time resource information of the second window interval are included in the window configuration information.

4. The method of claim 1, wherein the window configuration information is configured for each resource pool, and first window configuration information and second window configuration information are configured for one resource pool.

5. The method of claim 4, wherein one window configuration information among the first window configuration information and the second window configuration information is used, and the one window configuration information is determined according to a condition based on at least one of a size of transmission data, a required latency, a priority per data, or a priority per sidelink service.

6. The method of claim 1, further including: when the first resource sensing operation is completed before a reference time configured by the base station, early terminating the A window.

7. The method of claim 6, wherein the B window starts at an early termination time of the A window or a time after a window interval from the early termination time of the A window.

8. The method of claim 6, wherein the A window is early terminated when one or more conditions are satisfied, and the one or more conditions are determined based on at least one of a size of transmission data, a required latency, a priority per data, or a priority per sidelink service.

9. The method of claim 6, wherein when an early termination operation of the A window is enabled by the base station, the A window is early terminated.

10. A method of a transmitting user equipment (UE) in a communication system, the method comprising:
receiving, from a base station, window configuration information including a first parameter indicating a window #1, and a second parameter indicating a window #2;
performing a first resource sensing operation for transmission of a paging message and a second resource sensing operation for transmission of data associated with the paging message within the window #1 indicated by the window configuration information;
selecting a paging (P) transmission resource from P candidate resources determined by the first resource sensing operation within the window #2 indicated by the window configuration information;
selecting a data (D) transmission resource from D candidate resources determined by the second resource sensing operation within the window #2;
transmitting the paging message to a receiving UE in the P transmission resource; and
transmitting the data to the receiving UE in the D transmission resource, wherein the window #1 and the window #2 are configured independently of each other.

11. The method of claim 10, wherein when the first resource sensing operation and the second resource sensing operation are completed before a first reference time configured by the base station, the window #1 is terminated early.

12. The method of claim 11, wherein the window #2 starts at an early termination time of the window #1 or a time after a window interval from the early termination time of the window #1.

13. The method of claim 11, wherein the window #1 is early terminated when one or more conditions are satisfied, and the one or more conditions are determined based on at least one of a size of transmission data, a required latency, a priority per data, or a priority per sidelink service.

14. The method of claim 11, wherein when at least one operation of the first resource sensing operation and the second resource sensing operation is not completed within a second reference time configured by the base station, the window #1 is reconfigured, and the at least one operation is performed within the reconfigured window #1.

15. The method of claim 14, wherein the reconfigured window #1 starts from the second reference time or a time after an offset configured by the base station from the second reference time.

16. The method of claim 10, wherein the window configuration information includes time resource information of the window #1 and time resource information of the window #2.

17. The method of claim 10, wherein the window configuration information is configured for each resource pool, and first window configuration information and second window configuration information are configured for one resource pool.

18. The method of claim 17, wherein one window configuration information among the first window configuration information and the second window configuration information is used, and the one window configuration information is determined according to a condition based on at least one of a size of transmission data, a required latency, a priority per data, or a priority per sidelink service.

* * * * *